Jan. 21, 1964   G. C. SWENSON   3,118,184
HEATER FOR INJECTION MOLDING MACHINES
Filed Feb. 21, 1962   2 Sheets-Sheet 2

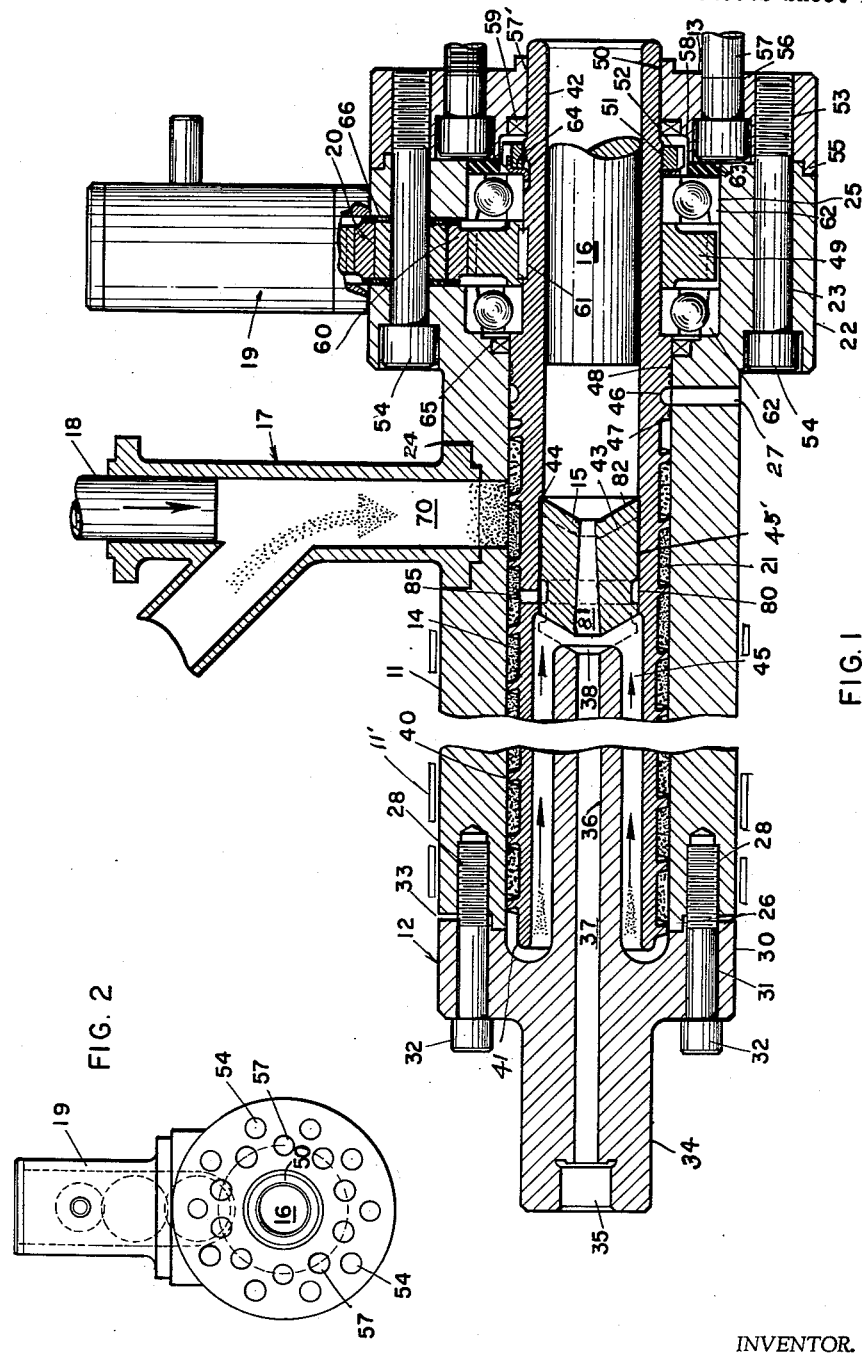

INVENTOR.
GORDON C. SWENSON
BY
Charles L. Lovercheck
attorney

United States Patent Office 3,118,184
Patented Jan. 21, 1964

3,118,184
HEATER FOR INJECTION MOLDING MACHINES
Gordon C. Swenson, 310 Arbuckle Road, Erie, Pa.
Filed Feb. 21, 1962, Ser. No. 174,737
19 Claims. (Cl. 18—30)

This invention relates to plastic molding machines and, more particularly, to heaters for use on molding machines which incorporate both a screw and a plunger for feeding the plastic into the die.

The molding machine heater disclosed herein has a combination rotatable screw and positive feed with an improved valve therebetween which allows the screw to force plastic material into the space ahead of the plunger between shots and directs the full force of the plunger into forcing the plastic to the die during a shot.

The embodiments of the plastic heater disclosed herein show reverse flow type screw feed heaters wherein the plastic is recirculated by the screw during the time the shot is taking place, thereby being thoroughly mixed and all entrained air and gases vented. Further, the recirculated melted plastic wets the granules of plastic entering from the hopper and thereby increases the rate of heat conductivity thereof.

At the end of each shot, the recirculation path is closed by an improved valve arrangement and plastic is directed from the screw to the plunger to replenish the plastic ahead of the plunger for the following shot.

In another embodiment of the invention, a reverse flow cylinder and screw are provided wherein the screw has a single continuous cylindrical bore of constant diameter extending entirely through it. Both the plunger and the valve of the device reciprocate in the bore. This single bore construction simplifies the machining operation in manufacturing the device.

The drive mechanism for the screw is so constructed that the bolts which hold the device together also function as an axle for supporting a drive gear.

The machine disclosed herein also has an improved driving mechanism for rotating the screw which is compact, requires a minimum amount of space, and makes it possible to reduce the overall dimension of the entire heater to a practical length.

More specifically, it is an object of the present invention to provide an improved combination screw feed and plunger feed heater.

Another object of the invention is to provide an improved driving mechanism for a screw in a combination screw feed and plunger feed plastic heater.

A further object of the invention is to provide an improved valve in a plastic heater.

A still further object of the invention is to provide a combination screw feed and plunger feed heater which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a longitudinal cross sectional view of a heater according to the invention;

FIG. 2 is an end view of the heater; and

Figure 3:
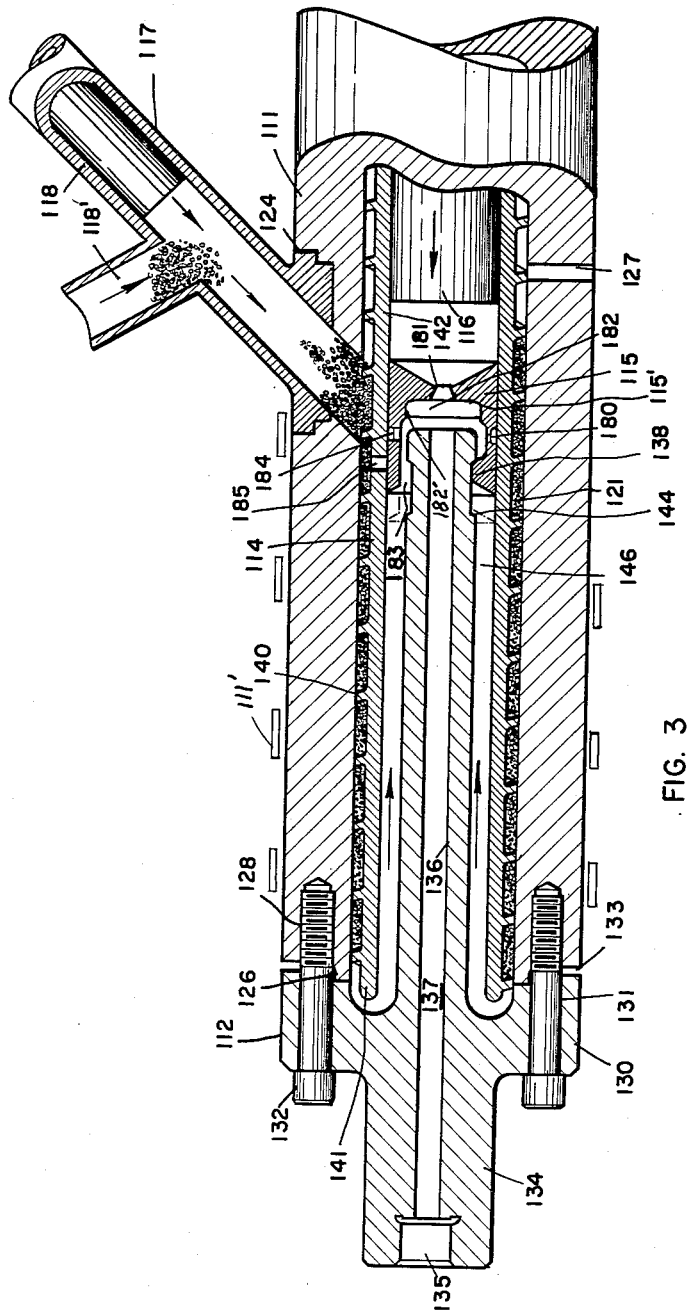
FIG. 3 is a view similar to FIG. 1 of another embodiment of the invention.

Now with more particular reference to the drawings, the heater shown in FIGS. 1 and 2 has a hollow cylindrical barrel 11 closed at one end by a nose piece 12 and having a hollow screw 14 rotatably received in the hollow of the barrel. A slide valve 15 and a main plunger 16 both reciprocate in the hollow of the screw 14. The screw may be rotated at a constant speed by a drive 19 and plastic material is forced into the flutes around the screw by a plunger 18.

The Molding Machine on Which This Heater Is To Be Used

The heaters disclosed herein are to be used with any conventional type molding machine having a high pressure ram.

The ram will be directly connected to the plunger 16 by a swivel coupler so that plunger 16 will rotate with screw 14 and will not be held against rotation therewith and the ram will engage plunger 16 on the forward stroke of the ram to force plunger 16 with it. The press ram and plunger will be forced back by the force of plastic on plunger 16, leaving plunger 16 to be forced back by plastic urged by screw 14 and densifier plunger 18.

Barrel 11

The barrel 11 has a finished hollow cylindrical bore 21 therein which receives the screw 14. The flute on the screw 14 fits fairly closely with the inside of the hollow barrel. The barrel 11 has a flange 22 on the upstream end with spaced counterbored holes 23 therein. A counterbored opening 24 on one side of the barrel communicates with the inside and receives a hopper 17. The bore 21 through the barrel has a counterbore 25 which receives the bearing and gear drive mechanism of the screw drive 19.

The downstream end of the barrel 11 has a reduced size outer portion which defines an annular, axially extending flange 26 and this flange 26 is received in a counterbore in the nose piece 12. A hole 85 is bored in the screw through the side adjacent the opening 24 in the barrel. Hole 85 communicates from the inside of the screw to the groove in the screw. The barrel is provided with conventional heating bands or means 11'.

Nose Piece 12

The nose piece 12 has a flange 30 with spaced holes 31 bored therein which receive bolts 32. The bolts 32 engage threaded holes 28 in the downstream end of the barrel and clamp the nose piece rigidly thereon. The axial flange 26 on the end of the barrel 11 is disposed in a counterbore in the nose piece and serves to both locate the nose piece and to form a tight fit therewith since a clearance space 33 is provided between the nose piece and the end of the barrel so that the entire force exerted by the bolts 32 is concentrated on the end of the flange 26.

The nose piece has a reduced size outlet end 34 terminating at the downstream end with a threaded counterbore 35 therein which may receive a suitable nozzle. A tube 36 is integrally attached to the nose piece and a hole 37 therein extends entirely through the nose piece and out to the counterbore 35.

The upstream end of the tube 36 has a frusto-conical seat 38 formed thereon and this seat receives the downstream end of the valve 15 to seal with it and thereby form a closure to direct plastic to the die and prevent plastic from being driven by the plunger 16 back through the space between the inside of the screw 14 and the outside of the tube 36.

Screw 14

The screw 14 has a spiral groove or flute 40 around the outside thereof which extends from upstream of the opening from the hopper 17 to a downstream end 41. The screw has a smooth cylindrical bore 42 which forms a cylindrical sealing surface with the plunger 16 and slidably receives plunger 16 therein.

The bore 42 has a first counterbore 43 which forms a sliding surface for the valve 15 which terminates at the upstream end at a shoulder 44. Shoulder 44 forms a stop for the valve 15 at the upstream end thereof to limit the movement of valve 15 in an upstream direction. Plunger 16 will be forced in a downstream direction by the main ram of the press but will not be retracted by the press plunger. Plastic will push the plunger 16 back to prevent air entrainment. When the press ram retracts and the valve 15 is pushed to the position shown by the plastic, plunger 18 may descend and densify plastic in the flute 40 and force plastic through the screw flute and aid the screw to force plastic through a bore 81 in the valve 15 to the space ahead of plunger 16, thereby forcing plunger 16 to the position shown after the press ram has retracted.

The screw 14 has a second counterbore 45 therein which defines the outside of the annular passageway for plastic material to flow between the inside thereof and the outside periphery of the tube 36.

A main gear 49 is keyed to the screw 14 and rotates the screw 14 in a direction to cause the flute thereon to drive plastic material from the hopper 17 to the space between the tube 36 and the inside of the screw.

The outside of the screw upstream from the flute 40 has a peripheral groove 46 therein which communicates with the hole 27. A spiral groove 47 having the same direction of lead as flute 40 is formed downstream from the groove 46 so that groove 47 will lead the material from the groove 46 toward the space between the flute 40.

A second spiral groove 48 is formed upstream of the groove 46 and the lead on the groove 48 is opposite from the lead of the flute 40 and groove 47 so that groove 48 will return oil to the bearing adjacent thereto. The outside upstream end of screw 14 has a reduced size diameter portion 50 which terminates in a shoulder adjacent the groove 48 and this shoulder forms a stop for a bearing 62 to rest against. The reduced size portion 50 is slidably received in a central bore in an end cap 13. Toward the outlet end of the barrel from the reduced size portion 50 is an externally threaded portion 51 which receives a nut 52. Nut 52 clamps the inner races of the bearings 62 against the shoulder at the end of the reduced size portion 50.

End Cap 13

The end cap 13 has outer spaced threaded holes 53 threadably received in bolts 54. These bolts clamp the end cap 13 to the flange 22. The flange 22 has an axially extending ram which is received in a groove 55 in the end cap and locates the end cap thereby.

Spaced counterbored holes 56 are formed in the end cap 13 spaced inwardly from the threaded holes 53 and these holes 56 receive the bolts 54. Bolts 54 provide means by which the entire device can be clamped to a molding machine.

A central hole 57' in the end cap rotatably receives the reduced size portion 50 of the screw 14 as aforesaid and a counterbore 58 of a hole 57 rotatably receives the nut 52. A packing washer 59 is received in a second counterbore inside the counterbore 58.

Main Screw Drive

The screw 14 is rotated at a constant rate by means of the drive 19 which rotates the screw 14 through the main gear 49. The drive is so arranged that it is compact and is built into the heater itself. The main gear 49 is keyed to the screw by a key 61. The gear 49 and screw 14 are carried by the bearings 62 which have their outer races snugly fit into the counterbore 25 and rest against the shoulder therein. A preload is put on the outer races of the bearings by a ring 63. The ring 63 has the outer ends thereof engaged by the inner surface of the end cap 13 and the end cap 13 is drawn toward the barrel 11 by the bolts 54 which squeeze the rings 63 up against the outer races of bearings 62.

The inner races of the bearings 62 are clamped between a lock washer 64 on the one side and the shoulder on the end of the shaft at the end of the reduced size portion 50. A packing washer 65 is disposed in a second counterbore in the barrel 11. Therefore, when the nut 52 is tightened up on the threaded portion 51 against the lock washer 64, it exerts a force on the inner races of the bearings 62 with the main gear 49 therebetween. The main gear 49 is in alignment with a slot 66 and, in this slot, a first intermediate gear 60 is disposed. The first intermediate gear 60 has a bearing 20 therein which is received in one of the bolts 54 as shown so that bolt 54 not only provides a clamping means to hold the end cap on the barrel but it also acts as a shaft upon which the intermediate gear 60 can rotate. The intermediate gear 60 is supported in the slot 66 and the teeth thereon mesh with the teeth on the main gear 49.

The outer side of the intermediate gear 60 meshes with a suitable gear in the drive 19. Therefore, when the drive 19 rotates, the intermediate gear 60 is rotated and it, in turn, rotates the main gear 49 which is keyed to the screw 14.

The lock washer 64 may be bent over into one of the slots in the outer periphery of the nut 52 when it has been tightened to the proper position so that it cannot be unscrewed from the threads on the screw.

Hopper 17

The hopper 17 has a cylindrical bore 70 therein in which the densifier plunger 18 reciprocates. The densifier plunger 18 may be moved up to the position shown so that granular material may be fed down the bore or feed opening 70 to fill the space below the plunger 18 with granular material. Then the densifier plunger 18 can descend and force the granular material through the cylindrical bore 70 and through the flutes of the screw back into the space adjacent the valve 15 and through the bore 81 urged by the screw 14.

Valve 15

The valve 15 is in the form of a cylinder with a generally frusto-conical countersink 82 at the upstream end and the bore 81 and a peripheral groove 80 in its circumference. The upstream end of bore 81 is substantially the same size as the hole 37 through the tube 36 at its downstream end. The bore 81 tapers to a smaller size at its upstream end to restrict the flow of plastic and give a greater pressure differential between the upstream end and the downstream end. The downstream end of the valve 15 is frusto-conical in shape and of complementary shape to the seat 38 so that when the valve 15 is pushed downstream to its phantom line position, it will form a seal with the seat 38.

When the valve 15 is in the solid line position, its entire cylindrical body is in counterbore 45'. The part of the cylindrical body of valve 15 downstream of groove 80 forms a seal with the inside of the counterbore 45'. Therefore, no plastic can flow through the bypass hole 85. Any plastic flowing from the hopper 17 must flow through the bore 81 into the space ahead of plunger 16. Plastic is forced to flow from hopper 17 around the flute of screw 14 by the rotary action of the screw itself. This action of the screw to force plastic through the bore 81 is supplemented by the ram action of the densifier plunger 18.

When the ram of the molding machine moves forward for a shot of plastic, it will engage the plunger 16 and force it toward the downstream end of the barrel 11.

Plastic in the chamber ahead of the plunger 16 will force the valve 15 to slide to the phantom line position. Its frusto-conical end will seat in the seat 38 and plastic from ahead of the plunger 16 will be driven directly through the tube 36 into a molding die.

Since in the phantom line position the cylindrical part of the valve downstream of the groove 40 will have moved into counterbore 45, plastic can flow from the screw flute, through the counterbore 45, around the end of the valve 15 to the groove 80, and back to the screw flute through the recirculation hole 85; however, valve 15 will be moved almost to the phantom line position before plastic can enter the groove 80.

Thus, during the time that the machine is delivering a shot of plastic to the die, screw 14 is recirculating plastic, thereby mixing it to eliminate entrained gas and to further render it homogenous.

At the end of the shot, the force of the press ram will be removed from plunger 16. When this happens, the force of screw 14 on the plastic in counterbore 45 will be exerted on the downstream end of valve 15. This will force valve 15 to the full line position. In this position, the downstream end of the valve 15 will enter the bore 42 and close the bypass through hole 85. Since the nozzle will be closed, plastic will be forced through the bore 81 into the space ahead of the plunger 16. The plunger 16 will be forced with the main plunger of the press to the retracted position required by the shot. The space ahead of plunger 16 will thus be filled in preparation for another shot.

The Embodiment of FIG. 3

The embodiment of the invention shown in FIG. 3 shows a heater having a hollow barrel 111 with a nose piece 112 at the outlet end and the inlet end of the barrel shown broken away. The inlet end would ordinarily be connected to a suitable drive and actauting arrangement such as shown in FIG. 1.

A screw 114 is rotatably received in a hollow bore 121 of the barrel 111 and a slide valve 115 opens and closes the passage from the plunger through the tube. The screw 114 may be rotated at a constant speed by a suitable drive and the plunger may be actuated by the main ram of the press.

Barrel 111

The barrel 111 has the finished hollow cylindrical bore 121 therein which receives the screw 114. The spiral defining the flutes on the screw 114 fits fairly closely to the inside of the hollow bore 121 of the barrel. The barrel may have a suitable flange and associated drive arrangement as in the embodiment of the invention shown in FIG. 1.

The downstream end of the barrel 111 has a reduced size outer portion which defines an annular, axially extending flange 126 and the downstream end of the flange 126 is received in a counterbore in the nose piece 112. A hole 127 communicates from the inside of the barrel to the outside thereof. The barrel is provided with conventional heating bands or means 111'.

Nose Piece 112

The nose piece 112 has a flange 130 with spaced holes 131 bored therein which receive bolts 132. The bolts 132 engage threaded holes 128 in the downstream end of the barrel 111 and clamp the nose piece rigidly thereto. The axial flange 126 functions to both locate the nose piece and to form a tight fit therewith since a clearance space 133 is provided between the flange 130 of the nose piece 112 and the end of the barrel. Thus, the entire force exerted by the bolts 132 on the flange 130 is concentrated on the end of the flange 126.

The nose piece 112 has a reduced size outlet end 134 terminating at the downstream end with a threaded counterbore 135 therein which may receive a suitable nozzle. A tube 136 is integrally attached to the nose piece and a bore 137 therein extends entirely through the nose piece and out to the counterbore 135.

The upstream end of the tube 136 has a relatively wide perpiheral groove 144 which receives an inwardly extending lug 138 on one side of the interior of the valve 115. The valve 115 has an annular seat 115' which seats on the end of the tube 136 when the plunger 116 is moving toward the tube, thereby forming a closed passage from the space ahead of the plunger to a bore 181 in the valve and through the bore 137 in the tube 136 through which plastic may be forced by the plunger 116.

Screw 114

The screw 114 has a spiral groove or flute 140 around the outside thereof. The flute 140 extends from the upstream end from the opening at a hopper 117 to a downstream end 141.

The screw has a smooth internal bore 142 which forms a cylindrical sealing surface with the plunger 116 and slidably receives the reciprocating plunger 116. The bore 142 also defines the outside of a flow passage, the other side of which is defined by the outside of the tube.

The bore through the screw is of uniform cross section throughout its entire length so that the valve 115 and plunger 116 each form a sliding fit therein.

It will be noted that the hopper 117 is disposed at an angle of approximately forty-five degrees to the axis of the barrel 111 so that the plunger forces the granules of plastic in a direction toward the outlet of the heating device.

The barrel 111 has the hole or bore 127 therein for venting gases to the outside of the barrel. The hopper 117 has a densifier plunger 118 therein also inclined toward the heater outlet which forces plastic from a feed opening 118' through the flutes of the screw to facilitate the movement thereof toward the outlet of the heater.

Valve 115

The valve 115 is generally in the form of a cylindrical cup having the bore 181 in its bottom and a hole 184 in its side. The hole 184 communicates with a peripheral groove 180. The cup has a first counterbore 182 and a second counterbore 183. The hole 184 from the inside of counterbore 183 to the outside of the valve communicates with the bore 185 in the screw when the valve is pushed forward to the phantom line position.

The valve 115 has an internal peripheral seat at 182' which forms a seal on the outside of the end of the tube 136 when the valve is in the forward position. The lug 138 is received in the groove 144 in the end of the tube and it limits the movement of the valve from the position shown, which is the retracted position, to the phantom line position. The counterbore 183 is larger than the outside diameter of the tube 136 so that when the nose piece 112 is removed from the barrel, lug 138 can be moved laterally from groove 144 and the valve separated from the nose piece. This facilitates and simplifies the manufacture of the device.

During operation and between shots, the screw 114 will be rotating and will force plastic from the hopper 117 through the space between the tube 136 and the inside bore of the screw through the bore 181 and into the space ahead of the plunger to fill this space when force on the plunger 116 is relieved. Just before a shot, the densifier plunger 118 will descend which will drive plastic material forward through the flutes of the screw 114 and exert a pressure on the plastic material ahead of the main plunger 116 aided by the motion of screw 114. Then the nozzle in the counterbore 135 will be pressed into the inlet of a die. The main plunger 116 will then be moved forward.

This will force the plastic ahead of the plunger 116 against the upstream end of the valve 115 which will force the seat 115' against the end of the tube 136 which will force the valve 115 to the closed phantom line position. This will cause the hole 184 to register with the bore 185 so that the screw can recirculate plastic through these bores and, at the same time, as the plunger 116 continues to advance, it will force plastic through the bore 181 and the bore 137 into the tube 136 into the die.

It will be noted that the end of tube 136 enters the counterbore 182 just before one edge of hole 184 passes the nearest edge of bore 185; that is, when valve 115 is midway between full line and phantom line position. The flow path from the bore 181 to hole 184 is closed before the holes or bores 184 and 185 register. Thus, plastic is put under high pressure by the plunger 116 and it cannot flow back up into the screw 114 by way of recirculation hole 185 and into the hopper. If the plastic under high pressure could flow back to the hopper 117, it could have an objectionable effect.

Since the end of tube 136 is rounded, as it approaches counterbore 182, it closes this passage gradually, thus giving a restricting effect to the flow of plastic from bore 181 to the space around tube 136.

The counterbore 182 has the secondary function of holding the tube 136 in perfect alignment with the bore 181 during the shot and directs it to a final seated position.

Because of the construction of the valve 115, it can be easily assembled on the tube 136 before it is put into the barrel 111 because there is a clearance between one side of the tube and the inside of the valve. Since the plunger 116 is forced to its position shown by pressure of the plastic ahead of the plunger 116, no air will be drawn into the plastic ahead of the plunger.

The foregoing specification sets forth the invention in its preferred practical forms but the structure shown is capable of modification within a range of equivalents without departing from the spirit thereof or from the scope of the appended claims.

The embodiments of the invention in which an exclusive property or privilege is claimed are defined as follows:

1. A heating device for plastic comprising a hollow barrel, a hollow screw rotatable in said barrel, said screw having a spiral flute in one part of its outer periphery, means to supply material to said screw, a tube extending into said hollow screw and connected to an outlet, a valve member slidably received in said screw, a main plunger slidably received in said screw, said valve member being between said tube and said main plunger, and an opening in said valve member communicating between said tube and said plunger, said valve member having an end adapted to be forced into sealing engagement with an end of said tube by said main plunger to direct plastic from said main plunger directly into said tube.

2. The device recited in claim 1 wherein an opening in said screw communicates between the inside and outside thereof, said valve member being adapted to be forced toward said plunger by plastic from said screw, closing said opening in said screw when pressure on said plunger is relieved, said valve member being slidable to open said opening in said screw when pressure on said plunger is increased.

3. The device recited in claim 2 wherein said means to supply material to said screw comprises a hopper, and a densifier plunger for forcing plastic from said hopper to said screw for urging plastic through said screw.

4. The device recited in claim 1 wherein a densifier plunger is disposed in a cylinder connected to the inlet of said barrel, said densifier plunger urging plastic through said screw into engagement with said plunger, said densifier plunger being inclined toward said outlet.

5. The device recited in claim 1 wherein said screw has means thereon to rotate it, said means to rotate said screw comprising a counterbore in said barrel remote from said outlet, a main gear in said counterbore fixed to said screw, a slot in one side of said barrel communicating with said counterbore, and drive means connected to said main gear.

6. The device recited in claim 5 wherein an end plate is disposed over the outer end of said counterbore, said barrel has a flange thereon concentric to said screw, an intermediate gear is disposed between said main gear and said drive means, and bolts extend through said flange and into said end plate to hold said end plate in position, one said bolt having said intermediate gear rotatably supported thereon.

7. The device recited in claim 5 wherein said screw has a reduced size portion joined thereto at a shoulder, two spaced bearings one on each side of said main gear, a nut threadably engaging said reduced size portion and forcing the inner races of said bearings to said main gear and forcing one said inner race into engagement with said shoulder, an intermediate part of said main gear being relieved to receive the outer races of said bearings, and clamping means urging said outer races toward each other and forcing one said outer race into engagement with the bottom of said counterbore whereby a preload is exerted on said bearings.

8. The device recited in claim 7 wherein said means exerting a preload on said bearings comprises a preload ring engaging the outer race of one said bearing, and said end plate engages said preload ring exerting a force thereon.

9. The device recited in claim 1 wherein said screw has means thereon to rotate it, said means to rotate said screw comprises a counterbore in said barrel remote from said outlet, a main gear in said counterbore keyed to said screw, a slot in one side of said barrel communicating with said counterbore, an intermediate gear in said counterbore meshing with said main gear, and drive means connected to said intermediate gear.

10. The device recited in claim 9 wherein an end plate is disposed over the outer end of said counterbore, said barrel has a flange thereon concentric to said screw, bolts extend through said flange and into said end plate to hold said end plate in position, one said bolt having said intermediate gear rotatably supported thereon.

11. The device recited in claim 10 wherein said screw has a reduced size portion joining said screw at a shoulder, two spaced bearings one on each side of said main gear, a nut threadably engaging said reduced size portion and forcing the inner races of said bearings to said main gear and forcing one said inner race into engagement with said shoulder, an intermediate part of said main gear being relieved to receive the outer races of said bearings, and clamping means urging said outer races toward each other and forcing one said outer race into engagement with the bottom of said counterbore whereby a preload is exerted on said bearings.

12. A heating device for plastic comprising a barrel having a cylindrical hollow therein with an inlet for plastic and an outlet end, a screw having a flute thereon rotatable in said barrel to urge plastic from said inlet to said outlet end, a tube attached to said outlet end of said barrel communicating with a discharge device and extending into said screw defining a passage between the outside of said tube and the inside of said screw for plastic to flow from the outlet end of said screw to the inner end of said tube, a plunger reciprocably mounted in the hollow of said screw, a valve in said screw between said plunger and said tube and defining a part of a closure for a space between said plunger and said valve, and a hole in said screw adjacent said valve, said hole connecting the outside thereof with the hollow therein to provide a recirculation path from said screw between said tube and the inside of said screw and back to said outside of said screw, said valve having means thereon opening said hole when said plunger moves toward said tube and closing said hole when said plunger moves away from said tube, said valve having an opening therethrough connecting the space between said plunger and said valve selectively with the inside of said tube when said plunger moves toward said tube and to the space between said screw and said tube when said plunger moves away from said tube.

13. The heating device recited in claim 12 wherein said means on said valve to open and close said hole comprises a peripheral circumferential groove in said valve, said hole in said screw communicating with said groove, said valve being movable to connect said groove and said hole to said passage between said tube and said screw when said plunger moves forward.

14. The heating device recited in claim 12 wherein said valve is cup shaped with the open end thereof receiving an end of said tube, said valve having a seating surface adjacent the inside bottom thereof sealingly engaging the end of said tube when said plunger moves toward said tube, said valve having a hole in a side thereof registering with said hole in said screw when said valve moves toward said tube, said valve closing said hole in said screw when said valve moves away from said tube.

15. The heating device recited in claim 14 wherein said cup shaped valve receives said end of said tube in a first counterbore and a second counterbore, said first counterbore being substantially larger than said tube and receiving said end of said tube when said valve is moved away from said tube, said end of said tube entering said second counterbore when said valve is moved toward said tube prior to said hole moving into registration whereby the flow of plastic from said plunger to said space around said tube is restricted.

16. A heating device for plastic comprising a hollow barrel having an inlet for plastic and an outlet, a hollow screw having a cylindrical bore therein rotatable in said hollow barrel, a tube in said screw defining a space between the inside of said screw and the outside of said tube and connected to said outlet, a plunger reciprocably supported in said screw, a generally cylindrical cup shaped valve slidably supported in said hollow screw between said tube and said plunger, a hole through said valve aligned with the inside of said tube and selectively connecting the space between said plunger and said valve with the space between said screw and said tube and to the inside of said tube, a bypass hole in said screw connecting the inside with the outside thereof, and a hole in one side of said valve registering with said bypass hole in said screw when said valve is forced into sealing engagement with said tube whereby said space between said tube and said screw is connected to the flute of said screw and plastic from said screw can recirculate back to said screw, said space between said plunger and said valve being connected by said valve directly to the inside of said tube.

17. The heating device recited in claim 16 wherein said cup shaped valve has a lug extending inwardly from the inside surface thereof, said lug being slidably received in a slot in the outside of said tube with a stop at each end of said slot, said stops limiting the sliding motion of said valve away from said tube.

18. A heater for plastic comprising a barrel, a hopper at one end of said barrel, an outlet at the other end of said barrel, a plunger in said barrel, a screw in said barrel for moving plastic from said hopper to said plunger, a valve, said valve having means thereon to allow plastic to flow from said screw to said plunger but preventing said plastic from flowing from said plunger to said screw, said valve directing said plastic from said plunger to said outlet, said hopper having a densifier plunger therein for forcing said plastic from said hopper around the flute of said screw, the part of said hopper adjacent said barrel being inclined inwardly and toward said outlet whereby said densifier plunger forces said plastic toward said outlet, a tube connected to said outlet, said valve comprising a cup like member receiving the end of said tube, and a hole in the bottom of said cup member, said screw being hollow and receiving said tube, said cup member having sliding engagement with the inside of said screw, said valve having a seat on the end thereof sealingly engaging said tube when said plunger moves toward said outlet and allowing plastic to flow through the hole therein to said tube.

19. The heater recited in claim 18 wherein said valve has a bore therein larger than said tube, said tube has a peripheral groove therein, and a lug on the inside of said cup member is received in said groove and moves against one side thereof when said valve moves to open position, limiting the movement of said valve.

References Cited in the file of this patent
UNITED STATES PATENTS
2,790,203      Dykehouse _____ Apr. 30, 1957